Sept. 27, 1966 W. J. SCOTT 3,275,348

HIGH PRESSURE SEALED CONNECTIONS

Filed May 28, 1963

INVENTOR.
William J. Scott,
BY
Cromwell, Greist + Warden
ATTYS

United States Patent Office 3,275,348
Patented Sept. 27, 1966

3,275,348
HIGH PRESSURE SEALED CONNECTIONS
William James Scott, Costa Mesa, Calif., assignor to VSI Corporation, a corporation of Illinois
Filed May 28, 1963, Ser. No. 283,733
1 Claim. (Cl. 285—212)

The present invention relates to sealed connections and, more particularly, to such connections which will withstand extremely high pressures and which will meet U.S. military standards and specifications.

An important object of the present invention is to provide new and improved high pressure sealed connections utilizing thin generally conical sealing members formed of deformable metallic material such as copper, aluminum, nickel, and alloys thereof whereby to provide fluid-tight sealed connections which will withstand high pressures, for instance, 40,000 p.s.i. of helium gas.

Another object of the present invention is to provide new and improved high pressure sealed connections of the character described wherein the sealing members thereof offer substantial resistance to radiation and are not affected by temperatures ranging between −420° F. and +1500° F.

Still another important object of the present invention is to provide new and improved high pressure sealed connections of the character described which include threaded bores formed in the structure and having conical seal-seating surfaces formed at their outer ends, male fitting members threaded in said bores and having seal-seating surfaces formed thereon which are generally complementary to the conical surfaces formed at the outer ends of the bores, and sealing members formed of deformable metallic materials and having generally conical portions tightly seated between the generally complementary seal-seating surfaces whereby to provide high pressure sealed connections at the outer ends of the bores.

Another important object of the present invention is to provide new and improved high pressure sealed connections of the character described wherein an effective high pressure seal is provided even if there are minute imperfections on the complementary seal-seating surfaces or a slight degree of angular misalignment between the male threaded member and the internally threaded bore because of the fact that the sealing members are physically deformed therebetween to compensate therefor.

Another important object of the present invention is to provide new and improved high pressure sealed connections of the character described wherein the sealing members which are formed of deformable metallic material are characterized by conical portions which are generally complementary to the seal-seating surfaces between which they are deformed and wherein the sealing members may be further characterized either by radially disposed outwardly directed flange portions adapted to be received in a spot face formed in the outer surface of the bore structure or by generally cylindrical portions provided with distensible flats for gripping the male fitting members.

Another important object of the present invention is to provide high pressure sealed connections of the character described wherein the male fitting members are provided with outwardly directed radial flange-like wrench-engageable portions, which wrench-engageable portions are spaced outwardly of the outer surface of the bore structures when the male fittings are tightened therein whereby to permit visual inspection of the seated sealing members.

A further important object of the present invention is to provide high pressure sealed connections of the character described which may utilize existing bore structures by reworking same to provide conical seal-seating surfaces at the outer ends thereof which are generally complementary to the conical portions of the deformable metallic sealing members and to the seal-seating surfaces on the male fitting members.

A still further important object of the present invention is to provide high pressure sealed connections of the character described which may utilize modified standard male fittings of the type having conical end surfaces at both ends thereof to provide high pressure sealed connections in installations wherein weight requirements are of importance, the standard fittings being modified by removal of the conical end surface at the end thereof to be inserted in the threaded bore and by substantial enlargement of the central bore through the fitting, thus substantially reducing the weight thereof.

A still further important object of the present invention is to provide high pressure sealed connections of the character described which will provide fluid-tight seals at extremely high pressures, for instance, 40,000 p.s.i. of helium gas, and which will meet U.S. military standards and specifications.

Certain other objects of the invention will, in part, be obvious and will in part appear hereinafter.

For a more complete understanding of the nature and scope of the invention reference may now be had to the accompanying drawings wherein.

Figure 1:
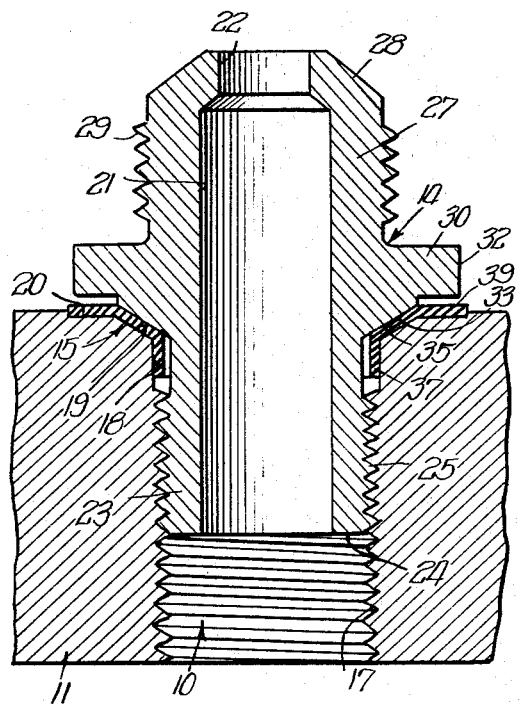
FIG. 1 is a central vertical section taken through a high pressure sealed connection embodying one form of the invention.

One form of a high pressure sealed connection embodying the invention, as illustrated in FIG. 1, includes a bore 10 formed in structure 11, which structure will be referred to as boss structure 11 and which bore will be referred to as boss port 10, a male fitting member 14, and a sealing member 15 which is formed of thin deformable or malleable metallic material, for instance, copper, aluminum, nickel, or alloys thereof. The boss port 10 is characterized by an internal or female thread 17 which terminates inwardly of the outer surface of the boss structure 11, by a non-threaded bore portion 18 disposed outwardly thereof, and by a bevel-like conical seal-seating surface 19 at the outer end of the bore or boss port 10 and preferably disposed at an angle of approximately 37° to the longitudinal axis thereof. The boss port 10 may be further characterized by a spot face 20 formed in the outer surface of the boss structure 11 which intersects the largest diameter end of the conical seal-seating surface 19.

The male fitting member 14 is characterized by a central bore 21 which extends therethrough and has a reduced-in-diameter bore portion 22 at its upper end (as viewed in FIG. 1), by an end portion 23 having a blunt end 24 which is insertable into the boss port 10 and which is provided with an external or male thread 25 which is threadedly engageable with the female thread 17 in the boss port 10, by an opposite end portion 27 which projects away from the boss structure 11 and which is provided with a conical end surface 28 and an external or male thread 29, and by an enlarged diameter portion 30 which is disposed intermediate the opposite threaded end portions 23 and 27. The enlarged diameter portion 30 of the male fitting member 14 is provided with an outwardly directed radial flange-like wrench-engageable portion 32 and with a conical seal-seating surface 33 which is spaced slightly away from the wrench-engageable portion 32 in a direction toward the end portion 23 of the fitting 14. The conical seal-seating surface 33 is preferably generally complementary to the conical seal-seating surface 19 at the outer end of the boss port 10 and is therefore disposed at an angle of approximately 37° to the longitudinal axis of the male fitting member 14.

The male fitting member 14, which is designed to use as little material as possible and which is therefore particularly well adapted for sealing installations wherein weight requirements are of importance, may be fabricated either in the form illustrated or by modifying a standard male fitting member of the type having conical end surfaces, such as the end surface 28, at both ends thereof, in which standard fitting members the central bore therethrough is uniform in diameter and generally equal to the reduced-in-diameter portion 22 of the male fitting member 14. In modifying such a standard fitting member to remove as much material therefrom as possible and thus to reduce the weight thereof, the conical end thereof which is to be inserted in the boss port 10 is cut off, thus defining the blunt end 24 of the fitting member 14, and the central bore therethrough is substantially enlarged until it is generally equal to the diameter of the major bore portion 21 in the male fitting member 14 of FIG. 1. The modification of such a standard male fitting member may then be completed by forming the conical seal-seating surface 33 on the enlarged diameter portion 30 thereof.

Figure 2:
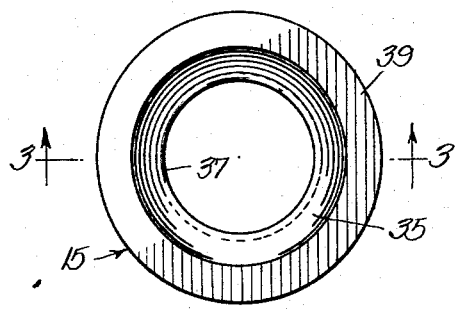
FIG. 2 is a top plan view of the deformable metallic sealing member of FIG. 1.
Figure 3:
FIG. 3 is a vertical section taken generally on the line 3—3 of FIG. 2.

The sealing member 15 best shown in FIGS. 2 and 3, which is formed of a thin malleable or deformable metallic material, is characterized by a conical portion 35 which is preferably disposed at an angle of approximately 37° to the central axis thereof and which is therefore complementary to the conical seal-seating surfaces 19 and 33 of the boss port 10 and the fitting member 14, respectively, by a generally cylindrical portion 37 which extends away from the smallest diameter end of the conical portion 35 and is adapted to be received in the non-threaded bore portion 18 of the boss port 10, and by an outwardly directed radial flange-like portion 39 at the largest diameter end of the conical portion 35 which is adapted to be received in the spot face 20 whereby to center the sealing member 15 in the boss port 10.

To form the high pressure sealed connection illustrated in FIG. 1, the conical seal 15 of FIGS. 2 and 3 is fitted in the outer end of the boss port 10 after which the male fitting member 14 is rotatably assembled in the boss port 10, as illustrated in FIG. 1, whereby to deform the sealing member 15 between the conical seal-seating surface 33 on the male fitting member 14 and the conical seal-seating surface 19 formed at the outer end of the boss port 10 in a manner providing a fluid-tight seal which will withstand extremely high pressures, for example, 40,000 p.s.i. of helium gas. Preferably, a predetermined specified torque is used in assembling the male fitting 14 in the boss port 10 with the deformable material of the metallic sealing member 15 being physically moved into any minute imperfection in either the conical seal-seating surface 33 on the fitting member 14 or the conical seal-seating surface 19 at the outer end of the boss port 10 whereby to form a sealed joint which is fully effective even at extremely high pressures.

As illustrated in FIG. 1, when the male fitting 14 is fully assembled in the boss port 10, the radially extending wrench-engageable flange portion 32 thereof is spaced outwardly of the outer surface of the boss structure 11, the arrangement being such that the wrench-engageable flange portion 32 cannot bottom on the outer surface of the boss structure 11 and possibly cock itself out of alignment in the boss port 10. This feature further permits a visual check that the sealing member 15 is properly seated in the outer end of the boss port 10.

Figure 4:
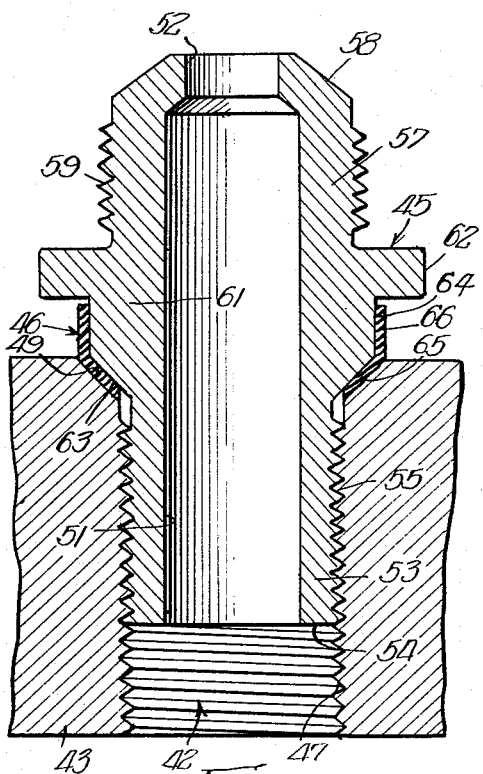
FIG. 4 is a central vertical section taken through a high pressure seal connection embodying another form of the invention.

Another form of a high pressure sealed connection embodying the invention, as illustrated in FIG. 4, includes a bore 42 formed in structure 43, which structure will be referred to as boss structure 43 and which bore will be referred to as boss port 42, a male fitting member 45, and a sealing member 46 which is formed of a thin deformable or malleable metallic material from the same group of metals listed herein for the sealing member 15. The boss port 42 is characterized by an internal or female thread 47 which terminates inwardly of the outer surface of the boss structure 43 and by a bevel-like conical seal-seating surface 49 which is formed at the outer end of the bore or boss port 42. Preferably, the conical seal-seating surface 49 is disposed at an angle of approximately 37° to the longitudinal axis of the poss port 42.

The male fitting member 45 is characterized by a central bore 51 which extends therethrough and has a reduced-in-diameter bore portion 52 at the upper end of the fitting member 45 (as viewed in FIG. 4), by an end portion 53 having a blunt end 54 which is insertable into the boss port 42 and which is provided with an external or male thread 55 which is threadedly engageable with the female thread 47 in the boss port 42, by an opposite end portion 57 which projects away from the boss structure 43 and which is provided with a conical end surface 58 and an external or male thread 59, and by an enlarged diameter portion 61 which is disposed intermediate the opposite threaded end portions 53 and 57. The enlarged diameter portion 61 of the male fitting member 45 is provided with an outwardly directed radial flange-like wrench-engageable portion 62 and with a conical seal-seating surface 63 which may also be generally semi-spherical in configuration and which is adapted to be seated against the conical seal-seating surface 49 provided at the outer end of the boss port 42 when the male fitting member 45 is assembled therein.

The male fitting member 45, which like the male fitting member 14 of the high pressure sealed connection of FIG. 1, is particularly well adapted for sealing installations wherein weight requirements are of importance. Thus, the male fitting member 45 may be fabricated either in the form illustrated in FIG. 4 or by modifying a standard male fitting of the type having conical end surfaces, such as the end surface 58, at each end thereof in the manner described previously herein in connection with the male fitting member 14 of FIG. 1.

Figure 5:
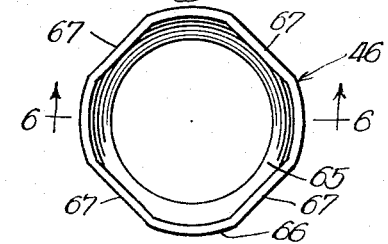
FIG. 5 is a top plan view of the deformable metallic sealing member of FIG. 4.
Figure 6:
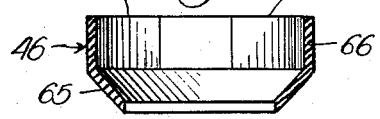
FIG. 6 is a vertical section taken generally on the line 6—6 of FIG. 5.

The centrally bored sealing member 46 shown in FIGS. 5 and 6, which is formed of a thin malleable or deformable metallic material and is adapted to be fitted over the generally complementary seal-seating surface 63 on the male fitting member 45, is characterized by a conical portion 65 which is preferably disposed at an angle of approximately 37° to the central axis thereof and which is therefore complementary to the conical seal-seating surface 49 formed at the outer end of the boss port 42, by a generally cylindrical portion 66 which extends away from the largest diameter end of the conical portion 65 toward the wrench-engageable flange portion 62 of the male fitting member 45, and by a series of circumferentially spaced distensible flats 67 which are formed on the cylindrical portion 66 and which are adapted for gripping a cylindrical portion 64 on the male fitting member 45 which extends between the wrench-engageable flange portion 62 and seal-seating surface 63 thereof.

To form the high pressure sealed connection illustrated in FIG. 4, the conical seal 46 of FIGS. 5 and 6 is fitted over the generally complementary seal-seating surface 63 of the male fitting member 45 after which the male fitting member 45 is rotatably assembled in the boss port 42, as illustrated in FIG. 4, whereby to seat and deform the sealing member 46 between the conical seal-seating surface 49 at the outer end of the boss port 42 and the generally complementary seal-seating surface 63 on the male fitting member 45 in a manner providing a fluid-tight seal which will withstand extremely high pressures, for example, 40,000 p.s.i. of helium gas. A predetermined specified torque is preferably used in assembling the male fitting member 45 in the boss port 42 with the deformable material of the metallic sealing member 46 being physically moved into any minute imperfections in either the conical seal-seating surface 49 at the outer end of the boss port 42 or the generally complementary seal-seating surface 63 on the male fitting member 45 whereby to form a sealed joint which is fully effective even at extremely high pressures.

As illustrated in FIG. 4, when the male fitting member 45 is fully assembled in the boss port 42, the radially extending wrench-engageable flange portion 62 thereof is spaced outwardly of the outer surface of the boss structure 43, the arrangement being such that the wrench-engageable flange portion 62 cannot bottom on the outer surface of the boss structure 43 and possibly cock itself out of alignment in the boss port 42. The foregoing feature also permits a visual check that the sealing member 46 is properly seated in the outer end of the boss port 42.

It has been found that the sealing members 15 and 46 of the high pressure sealed connections of FIGS. 1 and 4, respectively, should preferably be formed with a thickness ranging between .005 of an inch and .015 of an inch depending upon the diameter of the boss port and the male fitting member with which same are to be used. If such sealing members are too thick, the material thereof may relax more than may be compensated for by the residual torque in the threads of the connections and thus permit leakage therepast. On the other hand, if such sealing members are too thin, there is a possibility that same may be destroyed as the specified torque is applied in assembling the male fitting members in the boss ports. As the conical sealing members 15 and 46 are to be formed either of copper, aluminum, nickel, or alloys thereof, the sealed joints of the high pressure connections of FIGS. 1 and 4 provide substantial resistance to radiation and are not affected by temperatures as low as —420° F. and temperatures as high as +1500° F. It is noted further that it was first discovered and then substantiated through testing that angles other than approximately 37° for the conical portions 35 and 65 of the sealing members 15 and 46, respectively, would not provide complete entrapment thereof between the generally complementary seal-seating surfaces between which same are physically deformed.

If it should be necessary to remove the male fitting members 14 and 45 from the boss ports 10 and 42, respectively, the used sealing members 15 and 46 thereof must also be removed from the boss ports 10 and 42 and replaced by new non-deformed sealing members prior to reassembling the fittings 14 and 45 in the boss ports 10 and 42, respectively.

In the high pressure sealed connections of FIGS. 1 and 4, the conical portions 35 and 65 of the sealing members 15 and 46, respectively, thereof are actually reshaped during assembly of the fitting members 14 and 45 in the boss ports 10 and 42, respectively, to fit the physical dimensions and imperfections of the generally complementary seal-seating surfaces thereof, whereby to compensate for any eccentricity of angular misalignment of the fittings in the boss ports and for any imperfections on the generally complementary seal-seating surfaces thereof.

In connection with both of the high pressure sealed connections illustrated in FIGS. 1 and 4, it is noted that existing bores or boss ports may be utilized therefor by reworking same to form the conical seal-seating surfaces 19 and 49 at the outer ends thereof, whereby to accommodate the male fitting members 14 and 45 and the generally conical deformable metallic sealing members 15 and 46 associated therewith, respectively.

It is further noted that the upper end portions 27 and 57 of the male fitting members 14 and 45, respectively, are adapted to be sealingly connected to unions or flared tubings of known type with generally conical deformable metallic sealing members similar to the sealing members 15 and 46 being fitted over the conical end surfaces 28 and 58 of the fitting members 14 and 45, respectively, whereby to provide sealed joints which are effective at extremely high pressures.

It will be understood that certain changes may be made in the construction or arrangement of the high pressure sealed connections disclosed herein without departing from the spirit and scope of the invention as defined in the appended claim.

I claim:

A high pressure sealed connection comprising, in combination, a bore formed in structure and having an internal thread spaced inwardly of the outer end thereof, a conical surface formed at the outer end of said bore, a spot face formed on the outer surface of said bore structure and intersecting the largest diameter end of said conical surface, a male fitting having an externally threaded end portion threadedly engaged in said bore, a conical surface complementary to said conical surface at the outer end of said bore formed on an enlarged diameter portion of said male fitting, a deformable metallic sealing member which is characterized by a conical portion which is seated between said complementary conical surfaces at the outer end of said bore and on said male fitting, by a cylindrical portion at the smallest diameter end of said conical portion which extends into said bore, and by an outwardly directed radial flange portion at the largest diameter end of said conical portion which is seated in said spot face, said conical portion of said sealing member being physically deformed between said complementary conical surfaces when said fitting is tightened in said bore whereby to provide a high pressure sealed joint at the outer end of said bore, and an outwardly directed wrench-engageable flange portion on said fitting which is spaced outwardly of said bore structure when said fitting is tightened in said bore whereby to permit a visual check of said seated sealing member.

References Cited by the Examiner

UNITED STATES PATENTS

| | | | |
|---|---|---|---|
| 879,550 | 2/1908 | Huffmaster | 285—332.3 X |
| 1,133,320 | 3/1915 | Rockwood | 285—332.3 |
| 1,137,955 | 5/1915 | Dies | 285—332.3 X |
| 1,839,909 | 1/1932 | Weatherhead | 285—333 X |
| 3,139,294 | 6/1964 | Richards | 285—334.5 X |
| 3,145,035 | 9/1964 | Hanbeck | 285—212 X |
| 3,151,893 | 10/1964 | Lyon | 285—212 |

FOREIGN PATENTS 522,560  9/1953  Belgium.

CARL W. TOMLIN, *Primary Examiner.*

THOMAS F. CALLAGHAN, *Examiner.*

C. B. FAGAN, *Assistant Examiner.*